Figure 3:
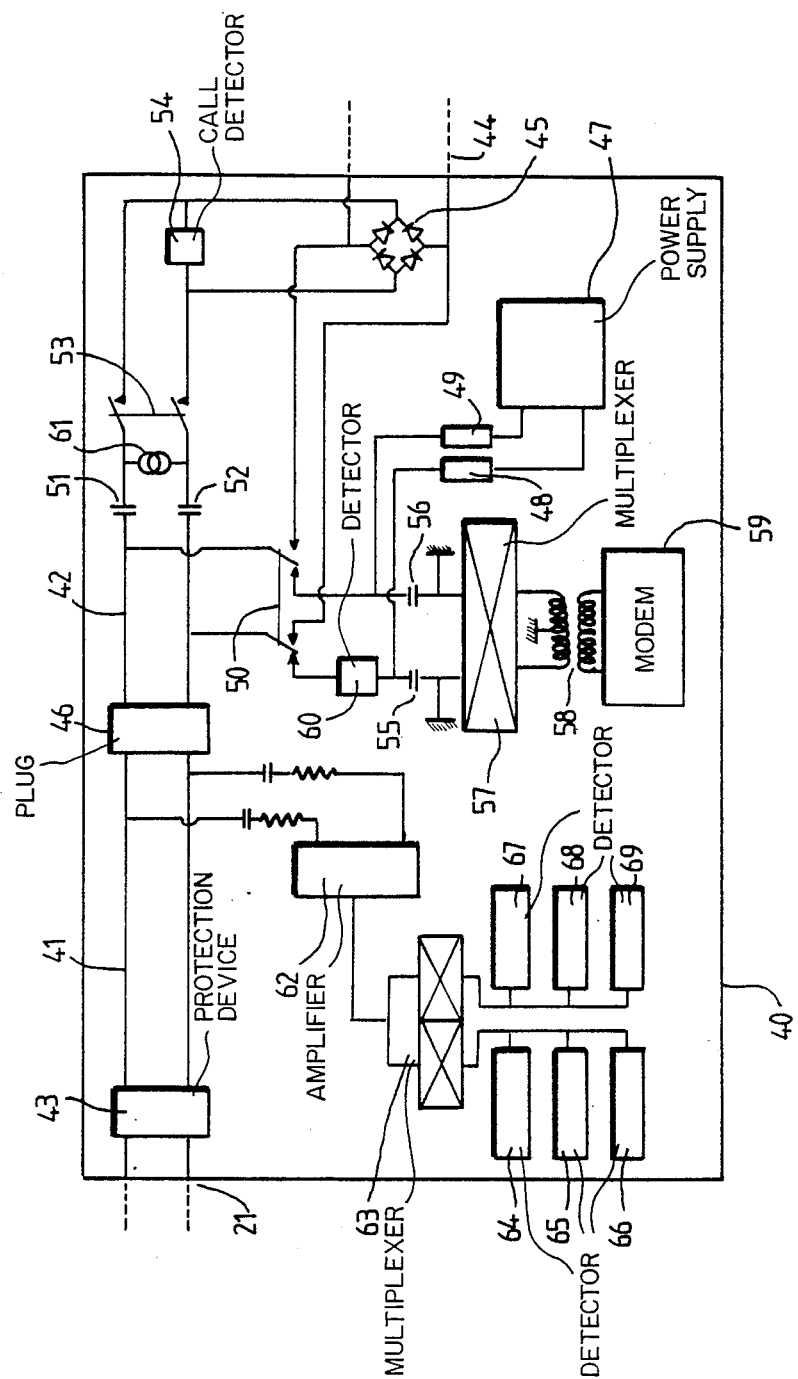

United States Patent [19]
Ayello et al.

[11] Patent Number: 4,926,466
[45] Date of Patent: May 15, 1990

[54] PERMANENT CONNECTION PUBLIC TELEPHONE APPLIANCE

[75] Inventors: Jean-Claude Ayello; Thierry Serradura, both of Valence, France

[73] Assignee: Crouzet, France

[21] Appl. No.: 351,192

[22] Filed: May 12, 1989

Related U.S. Application Data

[63] Continuation of Ser. No. 207,169, Jun. 15, 1988, abandoned.

[30] Foreign Application Priority Data

Jun. 24, 1987 [FR] France ............................. 87 08862

[51] Int. Cl.$^5$ ............................................ H04M 19/00
[52] U.S. Cl. ..................................... 379/143; 379/413
[58] Field of Search ............... 379/143, 413, 146, 144, 379/154, 155, 324

[56] References Cited

FOREIGN PATENT DOCUMENTS 2521984 11/1976 Fed. Rep. of Germany .
3528281  2/1987 Fed. Rep. of Germany .
2324175  4/1977 France .
83/03940 11/1983 PCT Int'l Appl. ................ 379/146
 512162  8/1971 Switzerland .
2177571  1/1987 United Kingdom .

Primary Examiner—James L. Dwyer
Attorney, Agent, or Firm—Jacobs & Jacobs

[57] ABSTRACT

A permanent connection public telephone appliance is provided for connection to the switched network by a connection unit. It is permanently fed with power romotely by a source of the connection unit connected in parallel across the line of the appliance. The switched network is isolated from the source by capacitors. Line connection to the appliance is provided by a relay of the connection unit.

8 Claims, 2 Drawing Sheets

PRIOR ART
FIG. 1
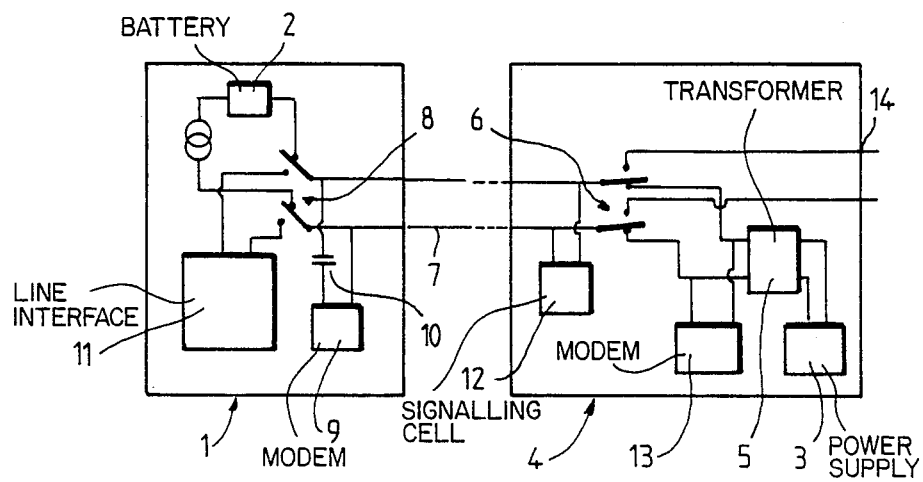
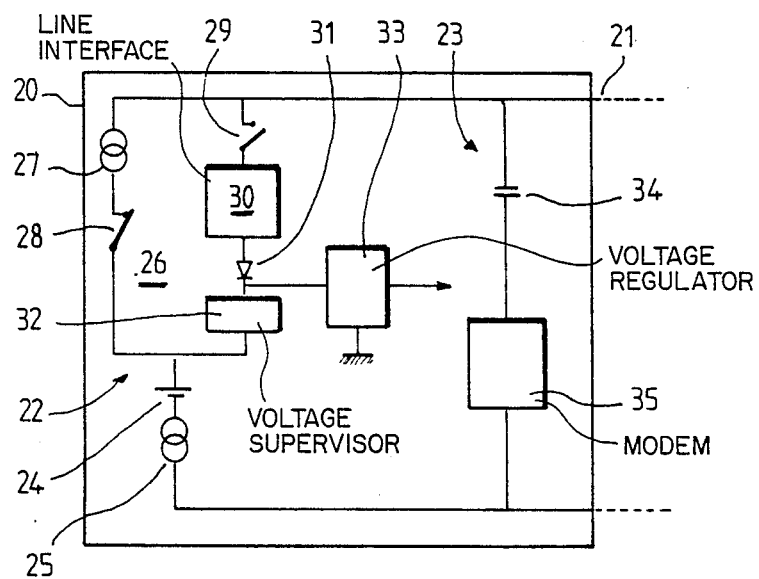
FIG. 2

PERMANENT CONNECTION PUBLIC TELEPHONE APPLIANCE

CROSS-REFERENCE

This is a continuation of Ser. No. 207,169 filed June 15, 1988, now abandoned.

The present invention relates to public telephone appliances, called publiphones, installed in public places, particularly those with call charge fixing means. More particularly, the invention relates to permanent connection publiphones, said to be "on line", for connection with the local switched telephone network and more precisely with an automatic switch, through a connection unit called publiphone connection unit PCU. As means for paying the call charges, the users of such publiphones may use either coins, conventional credit cards, memory cards or any other equivalent means.

Permanent connection publiphones have the particular characteristic that they are never isolated, even in the rest condition, i.e. outside periods of conversation, contrary to delayed connection publiphones, called "off line" which, for the quiescent current, are isolated in the rest condition.

Referring to FIG. 1 an on line publiphone 1 of the prior art is shown schematically comprising a battery 2 for supplying its different components with power and possibly, during the conversation periods, deliverying a current in addition to the current of the automatic switch. During rest periods, this battery is recharged by a power supply source 3 of the associated PCU unit, through a transformer 5 and a relay 6, in the PCU unit 4, line 7 of publiphone 1 and another relay 8, in the publiphone. Subsidiarily, and although they are not directly concerned by the problem to which the invention of the present application relates, such as will be stated further on, other elements of the publiphone and its PCU unit may be touched on here. In the publiphone, a modem-signalling cell assembly 9 is connected in parallel across line 7, in series with a capacitor 10, the relay 8, after switching, connecting a line interface to line 7 from which battery 2 is then isolated.

In the PCU unit 4, a signalling cell 12 is connected in parallel across line 7, switching of the relay 6 cutting off a modem 13 and the power supply source 3 from line 7 so as to connect this latter to the line of the automatic switch 14.

At rest, the power supply source 3 therefore charges battery 2 and the two signalling cells are in a mutual listening relation. After the handset of the publiphone has been lifted, the publiphone and its connection unit are connected together and a data exchange takes place through the modems 9, 13 until, after switching of relay 6, 8, the line interface 11 of the publiphone is connected to line 14 of the automatic switch.

Once the publiphone is connected to the automatic switch through its line interface, the current from the automatic switch flows through the publiphone and the conversation takes place by means of this current and possibly a small make-up current delivered by its battery.

Outside conversation periods, the battery of the publiphone is recharged but, during conversation periods, it is this battery which supplies the components of the publiphone with power without continuing to be recharged. With a publiphone of this type there is then the danger, considering the efficiency of the battery, of not being able to ensure the required traffic.

The present invention aims at overcoming such a drawback.

For this, the invention relates to a permanent connection public telephone appliance, intended to be connected to the local switched telephone network through a connection unit, comprising a battery for supplying the different elements of the appliance with power, adapted for being recharged by a power supply source of the connection unit, and a line interface intended to be connected to the switched network during conversation periods, characterized by the fact that the appliance and the connection unit are adapted so that the battery of the appliance is permanently recharged by the power supply source of the connection unit, the switched network is galvanically isolated from the power supply source of the connection unit, and connection of the appliance to the switched network is provided exclusively by the connection unit.

With the invention, the battery of the publiphone is recharged permanently and, because of the galvanic isolation, the switched network and so the automatic switch cannot be connected to the power supply source of the connection unit and the loop current of the automatic switch cannot flow through the publiphone, which avoids any fraud.

In the preferred embodiment of the invention, the power supply battery of the telephone appliance is inserted in a circuit connected in parallel across the line connecting the appliance to the connection unit and comprising, in series with the battery, a limiter limiting the quiescent current under rest conditions and the line interface under conversation conditions, the power supply source of the connection unit is connected in parallel across the line of the appliance and connection of the appliance to the switched network is provided by a relay inserted in the line connecting the connection unit to the switched network.

The invention will be better understood from the following description of a preferred embodiment of the public telephone appliance of the invention, with reference to the accompanying drawings in which:

FIG. 1 shows a block diagram of a public telephone appliance and the associated connection unit of the prior art, FIG. 2 shows a blow diagram of the public telephone appliance of the invention, and FIG. 3 shows a block diagram of the connection unit associated with the appliance of FIG. 2.

The public telephone appliance, or publiphone, 20 shown in FIG. 2 is intended to be connected, by a line 21 and a connection unit 40, to a local switched telephone network through an automatic switch. The appliance comprises two circuits 22, 23 in parallel across line 21. circuit 22 comprises in series a battery 24 for supplying the different elements of the appliance, a current limiter 25 for limiting the loop current, here to 60 mA and a parallel circuit 26. Circuit 26 comprises in parallel a quiescent current limiter 27 and a switch 28 and, in series, a switch 29, a line interface 30, a diode 31 and a voltage supervisor 32. Between diode 31 and supervisor 32 a voltage regulator 33 is connected. Circuit 23 comprises, in series, a capacitor 34 and a modem-signalling cell assembly 35.

The connection unit 35 includes two line sections 41, 42, one of which, 41, is connected to line 21 of the publiphone 20 through a protection device 43 and the other, 42, to the line 44 of the automatic switch through a rectifier bridge 45, the two sections 41, 42 being connected together by a plug 46. Unit 40 includes a power supply source 47, here delivering 48 V or 96 V, connected in parallel across the line section 42 through two electronic self inductances 48, 49 and a relay 50.

In the line section 42, between the connection of relay 50 and bridge 45, a pair of capacitors 51, 52 and a relay 53 are inserted with, in parallel, a current generator 61. In parallel across the line of section 42, between relay 53 and bridge 45, a call detector 54 is connected. In parallel across the line connecting relay 50 to source 47 a multiplexer 57 is connected, with interpositioning of two capacitors 55, 56 connected to ground, the multiplexer being connected to the terminals of the secondary, with grounded middle point, of a transformer 58, to the terminal of the primary of which a duplexer-modem assembly 59 is connected.

A current detector 60 is inserted in one of the lines connecting relay 50 to multiplexer 57.

The output of an amplifier 62 is connected in parallel across the line of section 41, with interpositioning of a pair of series resistance-capacitance circuits; to the input of which amplifier are connected the outputs of a double multiplexer 63 connected by its inputs to two series of detectors 64, 65, 66 and 67, 68, 69 respectively for two batteries of publiphones connected to the connection unit.

With the structure of the publiphone and its connection unit thus described, we will describe its operation.

The above described publiphone is a permanently connected appliance. In operation, during rest periods as during conversation periods, relay 50 of the connection unit 40 is always "open", in the position shown in FIG. 3, switching thereof providing continuity of the line as far as the automatic switch for an automatic test sequence.

With relay 50 of the connection unit 40 always in the "open" position, the publiphone 20 is remote fed from source 47 of unit 40, through the electronic self inductances 48, 49, of low impedance under DC current conditions, the relay 50, plug 46, the line section 41, the protection device 43 and line 21 of the publiphone. The battery 24 of the publiphone is therefore permanently recharged.

Coupling between the publiphone 20 and the automatic switch is provided by the capacitors 51, 52. Loop connections and disconnections by the automatic switch can only take place through relay 53, with looping to the current generator 61. Dialling from the publiphone passes directly through the capacitive connection 51, 52. It will be noted that because of the galvanic isolation capacitors 51, 52, the loop current of the automatic switch cannot flow through the publiphone 20.

Under rest conditions, switch 29 is open and switch 28 closed, limiter 27 playing its role for limiting the current, here to 50 mA. During conversation periods, it is the reverse, the line interface 30 being then in series with battery 24 and limiting the current, still to 50 mA.

The power supply voltage for the elements, not all shown because they are known by a man skilled in the art, of the appliance 20 is delivered by the regulator 33. It is the supervisor 32 which makes it possible, should a voltage drop occur at the output of regulator 33, to call on the battery 24 in an emergency.

At rest, the assembly 35 of appliance 20 and the assembly 20 of the connection unit 40 are in mutual listening relation; it is they which, when the handset (not shown) of appliance 20 is lifted, make it possible for appliance 20 to call unit 40 and, after acceptance by unit 40, to establish the connection before they exchange their data through modems 35, 59 and before appliance 20 requests the line of the automatic switch from the connection unit 40.

Let us see now in greater detail the two-way dialog between the publiphone 20 and its connection unit 40.

The transmission of data from publiphone 20 to the connection unit 40 takes place, without modems, at a frequency of 18 kHz. In the other direction, transmission takes place at a frequency of 2100 Hz. Detectors 60, 69 of the connection unit 40 are precisely at 18 kHz, the publiphone 2 having an 18 kHz oscillator. Plug 46 prevents the correspondent, at the other end of the line, from hearing this dialog. With modems, the call frequency of the publiphone is 4800 Hz received through one of the detectors 64, 67, the dialog continuing between the modems of the publiphone and the connection unit at 1200 bauds.

The dialog between publiphone 20 and the connection unit is limited to sending orders followed by the sending of accepts.

In the direction from the publiphone to the connection unit, it is a question of line connection requests, namely requests for closure of relay 53, and line disconnection requests, or opening of relay 53. In both cases, the publiphone transmits a rectangular pulse of predetermined length, the connection unit accepts, after a time which is also predetermined, by another rectangular pulse, still of predetermined length, and carries out the order at the end of a precise time. If the publiphone does not receive an accept, it repeats its order a limited number of times.

In the direction from the connection unit to the publiphone, it is a question of ringing tone initiation requests and ringing tone suppression requests. The procedure is here similar to that of the publiphone requests. It is again a question of requests for being placed in the test condition and suppression of this condition. Here, however, the procedure for suppressing the test condition is rather special, the connection unit unit changing condition before sending its suppression order to the publiphone, and the publiphone changing condition before sending its accept.

At the same time as the line connection and disconnection requests and ringing tone initiatio and suppression requests, a signalling signal is delivered, in the absence of modems, also at the frequency of 18 kHz by the publiphone so that the connection unit can make sure that the publiphone is present at the end of the telephone line, whatever the operating phase of the publiphone. The signalling signal is delivered cyclically.

Again at the same time, the publiphone must transmit an echo signal, after it has recognized valid call charge pulses at the frequency of 12 kHz, or 50 Hz, which are sent thereto by the automatic switch of the switched network, via one of the detectors 65, 68 of the connection unit.

The signalling and call charge echo signals of the publiphone are the same. Since the transmission of the signalling signal and reception of a call charge may be simultaneous, because it is impossible to define sufficiently accurately the probability of arrival of a call charge, the publiphone and the connection unit simultaneously process the signalling and the call charge signal.

The means for establishing a two-way dialog between the publiphone and the connection, signalling and call charge echo transmission unit form the means for supervising the publiphone.

We claim:

1. Permanent connection public telephone appliance, intended to be connected to the local switched telephone network through a connection unit, comprising a battery for supplying the different elements of the appliance with power, adapted for being recharged by a power supply source of the connection unit, and a line interface intended to be connected to the switched network during conversation periods, characterized by the fact that the appliance and the connection unit are adapted so that the battery of the appliance is permanently recharged by the power supply source of the connection unit, the switched network is galvanically isolated from the power supply source of the connection unit, and connection of the appliance to the switched network is provided exclusively by the connection unit.

2. Public telephone appliance according to claim 1, wherein the power supply battery of the telephone appliance is inserted in a circuit connected in parallel across the line connecting the appliance to the connection unit and comprising, in series with the battery, a limiter limiting the quiescent current under rest conditions and the line interface under conversation conditions.

3. Public telephone appliance according to claim 1, wherein, the power supply source of the connection unit is connected in parallel across the line of the telephone appliance.

4. Public telephone appliance according to claim 3, wherein connection of the power supply source to the line of the telephone appliance is provided through a test relay.

5. Public telephone appliance according to claim 3, wherein connection of the power supply source to the line of the telephone appliance is provided through two electronic self inductances.

6. Public telephone appliance according to claim 1, wherein connection of the appliance to the switched network is provided by a relay inserted in the line connecting the connection unit to the switched network.

7. Public telephone appliance according to claim 6, wherein the capacitors, inserted in the line connecting the connection unit to the appliance, between the relay and the appliance, isolate the switched network galvanically from the power supply source.

8. Public telephone appliance according to claim 6, wherein a current generator, in parallel across the line connection relay provides, on the switched network side, loping of the loop current.

* * * * *